(12) United States Patent
Hardcastle et al.

(10) Patent No.: US 7,437,439 B2
(45) Date of Patent: Oct. 14, 2008

(54) SYSTEM AND METHOD FOR THE HYBRID HARVESTING OF INFORMATION FROM PERIPHERAL DEVICES

(75) Inventors: Michael J. Hardcastle, Colorado Springs, CO (US); Robert L. Perez, Meridian, ID (US); William A. Cox, Melbourne, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 936 days.

(21) Appl. No.: 10/308,784

(22) Filed: Dec. 3, 2002

(65) Prior Publication Data

US 2004/0107275 A1    Jun. 3, 2004

(51) Int. Cl.
*G06F 15/173* (2006.01)
(52) U.S. Cl. .................... 709/223; 709/224
(58) Field of Classification Search ............. 709/217, 709/218, 223, 224
See application file for complete search history.

(56) References Cited

U.S. PATENT DOCUMENTS

| | | | | |
|---|---|---|---|---|
| 5,838,919 | A * | 11/1998 | Schwaller et al. | 709/224 |
| 6,009,480 | A * | 12/1999 | Pleso | 710/8 |
| 6,067,558 | A * | 5/2000 | Wendt et al. | 709/202 |
| 6,092,105 | A * | 7/2000 | Goldman | 709/217 |
| 6,247,061 | B1 * | 6/2001 | Douceur et al. | 709/240 |
| 6,298,421 | B1 * | 10/2001 | Minamizawa et al. | 711/151 |
| 6,314,476 | B1 * | 11/2001 | Ohara | 710/15 |
| 6,336,151 | B1 * | 1/2002 | Seki | 710/8 |
| 6,360,258 | B1 * | 3/2002 | LeBlanc | 709/223 |
| 6,434,643 | B1 * | 8/2002 | Ejiri | 710/58 |
| 6,553,428 | B1 * | 4/2003 | Ruehle et al. | 719/330 |
| 6,735,702 | B1 * | 5/2004 | Yavatkar et al. | 726/13 |
| 6,857,013 | B2 * | 2/2005 | Ramberg et al. | 709/223 |
| 6,959,392 | B1 * | 10/2005 | Yamamoto et al. | 726/5 |
| 7,017,152 | B2 * | 3/2006 | Bystedt et al. | 717/130 |
| 7,058,705 | B1 * | 6/2006 | Fukasawa et al. | 709/223 |
| 7,231,435 | B2 * | 6/2007 | Ohta | 709/221 |
| 2002/0069263 | A1 * | 6/2002 | Sears et al. | 709/218 |
| 2002/0101604 | A1 * | 8/2002 | Mima et al. | 358/1.15 |
| 2003/0055876 | A1 * | 3/2003 | Korala et al. | 709/223 |
| 2003/0115314 | A1 * | 6/2003 | Kawashima | 709/224 |
| 2004/0001218 | A1 * | 1/2004 | Christiansen | 358/1.15 |
| 2005/0271039 | A1 * | 12/2005 | Boehmke | 370/351 |
| 2006/0010232 | A1 * | 1/2006 | Page et al. | 709/223 |
| 2006/0044600 | A1 * | 3/2006 | Oosawa | 358/1.15 |
| 2007/0188804 | A1 * | 8/2007 | Henderson et al. | 358/1.15 |

OTHER PUBLICATIONS

U.S. Appl. No. 10/308,761, Hardcastle.

* cited by examiner

*Primary Examiner*—Nathan J. Flynn
*Assistant Examiner*—Mohamed Wasel

(57) ABSTRACT

In one embodiment there is a system and method for harvesting data from at least one device, such that there is stored on a particular device, prior to the start of each harvesting session, an application program, which enables the harvesting of certain data from the device. At the conclusion of a harvesting session, the application program is removed from the device. In one embodiment the application is in the form of a chailet.

17 Claims, 2 Drawing Sheets

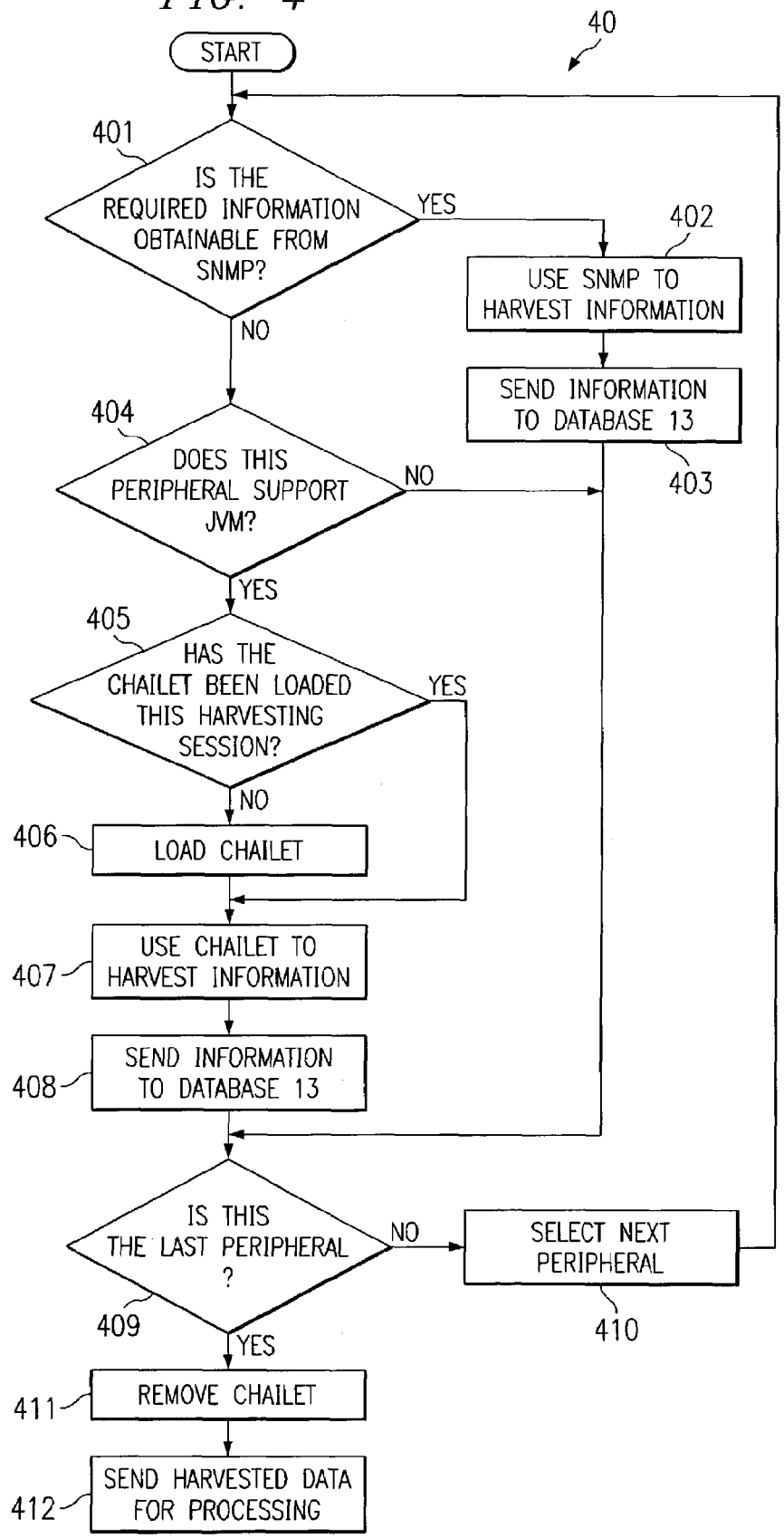

SYSTEM AND METHOD FOR THE HYBRID HARVESTING OF INFORMATION FROM PERIPHERAL DEVICES

CROSS-REFERENCE TO RELATED APPLICATIONS

The present application is related to commonly-assigned U.S. patent application Ser. No. 10/308,761 entitled "SYSTEM AND METHOD FOR HARVESTING OF DATA FROM PERIPHERAL DEVICES", the disclosure of which is hereby incorporated by reference herein.

FIELD OF THE INVENTION

This invention relates to the harvesting of data from remote devices and more particularly to a system and method for the harvesting of such data using hybrid techniques.

DESCRIPTION OF RELATED ART

It has become common practice to electronically retrieve, or harvest, parametric information such as, for example, consumables status, device state, and error conditions from peripheral devices. These peripherals can be, for example, printers, multifunction devices, and copiers. Currently, this harvesting is accomplished using Ethernet protocols, such as System Network Management Protocol (SNMP). In many situations, the target peripheral devices (the devices from which the information is to be harvested) do not support the SNMP protocol or only partially support that protocol.

One solution to this problem would be to add an interpretive code to the peripheral device. Such code is called a chailet and would reside in a memory device on the peripheral. This solution, however, has a major limitation in that the peripheral device would have to have some form of permanent memory so that the chailet could survive power cycles (for example, the off-condition) of the peripheral device. Such permanent memory is expensive, rendering this solution uneconomical.

BRIEF SUMMARY OF THE INVENTION

In one embodiment there is disclosed a system and method for harvesting data from a plurality of devices, such that there is stored on a particular device, prior to the start of each harvesting session, an application program that enables the harvesting of certain data from the device. At the conclusion of each harvesting session, the application program is removed from the device. In one embodiment, the application is in the form of a chailet.

BRIEF DESCRIPTION OF THE DRAWINGS

FIG. 4 is a flow chart of one embodiment of a system utilizing the concepts of the invention.

DETAILED DESCRIPTION

Figure 1:
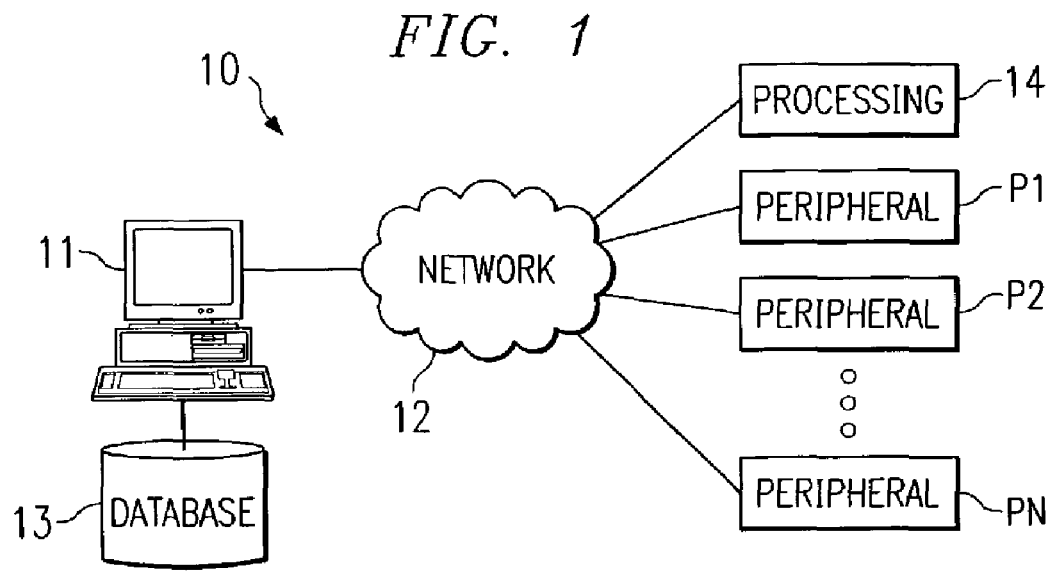
FIG. 1 shows one embodiment of a system using the inventive concepts.

Turning now to FIG. 1, there is shown system 10 in which processor 11 is shown in conjunction with database 13 adapted for harvesting data from a plurality of peripheral devices P1-PN via network 12. The harvested information from peripherals P1-PN is stored, in one embodiment, temporarily in database 13 and is then communicated under control of processor 11 to processing center 14 at a location remote from the peripheral devices.

Note that using the system and methods of this invention, processor 11 may gather data from one peripheral P1 or from a group of peripherals, with the gathered data being stored in database 13 for a period of time. The system could be established such that data can be harvested from several groups (or nodes) of peripherals with the data being stored in database 13. Subsequently, at some time when it is convenient, the data may be transmitted from database 13 via network 12 to processing location 14. Processing location 14 can be, for example, a system that keeps track of the consumables, such as ink and paper, used in a printer (or other peripheral device) so that a central location can re-supply the consumables to each device as necessary. This allows for the proper operation and maintenance of peripheral devices P1-PN from a remote location.

Figure 2:
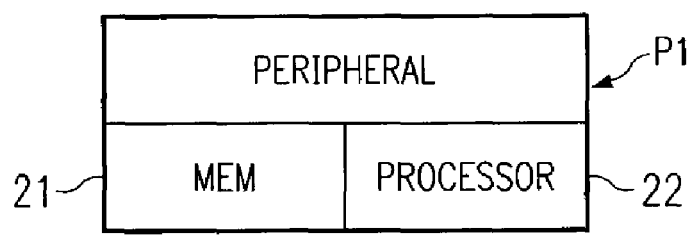
FIG. 2 shows one embodiment of a peripheral device.

Turning now to FIG. 2, there shown peripheral P1 having processor 22 and memory 21 contained therein. Processor 22 may be optional, and memory 21 may be volatile, nonvolatile, or combination thereof and could be of any size. Various programs for operating device P1 are typically contained in memory 21, some of the programs are capable of being accessed from an external source. Typically, the interaction between the harvesting system and the specific peripheral device would be under control of System Network Management Protocol (SNMP), which is an internet protocol that is utilized for the gathering of data from various peripheral devices connected to a specific network.

Figure 3:
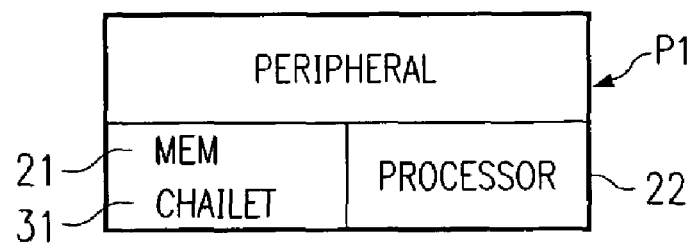
FIG. 3 shows one embodiment of a peripheral device having a chailet stored therein.

FIG. 3 shows a schematic view of peripheral P1 with processor 22 and memory 21 with the addition of chailet 31. In one embodiment, chailet 31 has been downloaded from processor 11 through network 12 (FIG. 1) into peripheral P1. Preferably, chailet 31 has relatively few lines of code and is loaded at the beginning of the harvesting cycle for a particular peripheral device (or group of devices). Chailet 31 is removed from peripheral device P1 (or group of devices) at the end of the harvesting session. During the harvesting session chailet 31 acts as the intermediate code between a network SNMP application and a locally supported JAVA program on peripheral device P1.

Turning now to FIG. 4, there is shown one embodiment of a system and method 40 utilizing the inventive concepts. At the start, an inquiry is made via process 401 as to whether the required information is obtainable from SNMP. If obtainable, then the SNMP is used to harvest the information via process 402 and that information is sent for storage in database 13 via process 403.

If the required information is not obtainable from SNMP, as determined by process 401, then process 404 determines if the peripheral supports Java Virtual Machine (JVM) and installable JAVA programs. If the answer is no, then data cannot be harvested from this peripheral device, and the system goes on to check for other peripheral devices, via process 409.

However, if the peripheral device does support the JVM, as determined by process 404, then process 405 determines if a chailet has been loaded this harvesting session. If a chailet has not been loaded as determined by process 405, then a chailet is loaded via process 406 under control of processor 11 (FIG. 1). If the chailet was previously loaded, or once the chailet is loaded on a device, it is then operable to assist in harvesting data from the specific device via process 407. The harvested data is sent to database 13 via process 408. When all data has been harvested from the specific peripheral device, a determination is again made via process 409 as to whether this is the last peripheral. If it is not the last peripheral, then the next peripheral is selected via process 410 and the iterations repeat.

If this was the last peripheral, then the chailet that had been stored at the beginning of the session is removed via process 411. After removing the chailet via Process 411, the data that has been harvested can remain in database 13 for a period of time for later delivery or could be delivered, under control of process 412, to a remote location, such as to processing 14 via network 12, as shown in FIG. 1.

What is claimed is:

1. A method for harvesting data from at least one device, said method comprising:
    storing on said at least one device an application program, said storing occurring prior to the start of a harvesting session, wherein said application program is a chailet including code interpreting between JAVA Virtual Machine and SNMP;
    enabling said stored application program to harvest certain data front said at least one device;
    prior to said storing step, determining if said certain data is obtainable from SNMP;
    inhibiting said storing and enabling steps if it is determined that said certain data is obtainable from SNMP, and obtaining said certain data using SNMP;
    communicating said harvested data to an application common to said least one device; and
    removing said stored application program from said at least one device at the conclusion of said communicating step.

2. The method of claim 1 further comprising:
    if it is determined that said certain data is not obtainable from SNMP, then determining if said at least one device supports JVM.

3. The method of claim 1 wherein said common application is the SNMP application.

4. The method of claim 1 wherein said at least one device is a printer.

5. The method of claim 1 further comprising:
    repeating said storing, enabling, communicating and removing steps for said at least one device; and
    storing harvested data in a database in relationship to said at least one device from which said harvested data was communicated.

6. The method of claim 5 further including:
    transmitting said stored harvested data to a processing center.

7. The method of claim 6 wherein said transmitting step occurs only when data has been harvested from a plurality of said at least one devices.

8. A system for harvesting data from at least one device, said system comprising:
    means for storing within said at least one device a chailet sent from a source external to said at least one device, wherein said chailet includes code interpreting between JAVA Virtual Machine and SNMP
    means, including said stored chailet, for harvesting certain data from said at least one device;
    means, operable if said certain data from said at least one device is obtainable from SNMP, for inhibiting said storing means and said means, including said stored chailet, for harvesting certain data, and harvesting said certain data using SNMP instead of the chailet;
    means for communicating said harvested data to a database remote from said at least one device; and
    means for removing said stored chailet from said at least one device at the conclusion of said harvesting of said certain data from said at least one device.

9. The system of claim 8 wherein said storing means includes at least a portion of a memory device resident within said at least one device, said memory device primarily used by said at least one device for tasks other than storing said chailet.

10. The system of claim 8 further comprising:
    means for determining if said at least one device supports JVM and if said certain data is not obtainable from SNMP, for enabling said storing means with respect to said at least one device.

11. The system of claim 8 wherein said at least one device is a printer.

12. The system of claim 8 further comprising:
    means for storing communicated certain data from said at least one device in a database in relationship to said at least one device from which said data was harvested.

13. The system of claim 12 further comprising:
    means for transmitting said stored communicated data to a processing center.

14. The system of claim 13 wherein said transmitting means is only enabled when said certain data has been harvested from a particular group of said at least one devices.

15. The system of claim 8 wherein said storing means includes volatile memory resident within said at least one device.

16. A method of periodically harvesting data from at least one peripheral device containing limited volatile memory, said method comprising:
    storing within said volatile memory a relatively small amount of code, wherein said code interprets between JAVA Virtual Machine and SNMP;
    harvesting data from said at least one peripheral device, said harvesting facilitated by said stored code;
    prior to said storing step, determining if said data is obtainable from SNMP;
    inhibiting said storing and harvesting if it is determined that said data is obtainable from SNMP, and harvesting the data using SNMP instead of the small amount of code;
    communicating said harvested data from said at least one peripheral device to a storage location; and
    removing said code from said volatile memory on a periodic basis.

17. The method of claim 16 wherein said code is stored at the beginning of each harvesting session with respect to said at least one peripheral device and removed at the end of said harvesting session.

* * * * *

UNITED STATES PATENT AND TRADEMARK OFFICE
CERTIFICATE OF CORRECTION

PATENT NO.        : 7,437,439 B2                                    Page 1 of 1
APPLICATION NO. : 10/308784
DATED             : October 14, 2008
INVENTOR(S)       : Michael J. Hardcastle et al.

It is certified that error appears in the above-identified patent and that said Letters Patent is hereby corrected as shown below:

In column 3, line 21, in Claim 1, delete "front" and insert -- from --, therefor.

In column 3, line 28, in Claim 1, after "said" insert -- at --.

In column 3, line 51, in Claim 7, delete "devices" and insert -- device --, therefor.

In column 4, line 18, in Claim 10, delete "JVM" and insert -- JVM, --, therefor.

In column 4, line 32, in Claim 14, delete "devices" and insert -- device --, therefor.

Signed and Sealed this

Thirty-first Day of March, 2009

JOHN DOLL
*Acting Director of the United States Patent and Trademark Office*